United States Patent Office 2,900,410
Patented Aug. 18, 1959

2,900,410

WATER-SOLUBLE DERIVATIVES OF SALICYLIC ACID AND PROCESS FOR PREPARING SAME

Remsen T. Schenck, Bangor, Pa., assignor to Keystone Chemurgic Corporation, Bethlehem, Pa., a corporation of Pennsylvania No Drawing. Application March 7, 1957
Serial No. 644,486

8 Claims. (Cl. 260—474)

This invention relates to water soluble derivatives of salicylic acid and to processes for prepaartion of same and to aqueous analgesic and antipyretic solutions thereof. More particularly it relates to water soluble $\gamma$-sulfopropyl salicylates such as the sodium salt of $\gamma$-sulfopropyl salicylic ester and the sodium salt of $\gamma$-sulfopropyl acetylsalicylic ester, to aqueous analgesic and antipyretic solutions thereof, and to process for preparing such compounds and solutions.

Salicylic acid and some of its derivatives occupy a very important place in the pharmacopoeia. They are widely and extensively used as analgesics, to ameliorate low-level pain. As they have a decided antipyretic effect, they are often employed to moderate and control fevers, particularly in children. They have also a specific action against rheumatism and arthritis; the treatment is in this case doubly beneficial, in that salicylate therapy at the same time alleviates the discomfort and has a curative influence on its cause. The toxicity of salicylates is so low that cases of poisoning are almost unknown when the drugs are used in recommended dosages. Salicylic acid and sodium salicylate are somewhat more toxic than certain derivatives; the commonest forms are therefore acetylsalicylic acid, salicylsalicylic acid and salicylamide. Salicylates in general are almost free from side-reactions: idiosyncrasies are rarely encountered, and other untoward effects are both uncommon and unimportant.

Since the salicylic acid derivatives which combine the greatest effectiveness with the lowest toxicity, such as acetylsalicylic acid, salicylsalicylic acid and salicylamide, are soluble in water only to the extent of a fraction of 1%, they are invariably dispensed in the solid state, in the form of tablets, capsules or powders. For the most part this is satisfactory, but in certain cases it is not possible to administer a solid drug. An appreciable fraction of the adult population, for instance, is incapable of swallowing a capsule or tablet; any attempt to do so excites a gag reflex, and the dose is regurgitated. Children present a problem, too: they often refuse to swallow a tablet, especially one with the sour, acrid taste of a salicylate, and if it is sugar-coated to disguise this, the risk is incurred that it will be regarded as "candy" and consumed to excess surreptitiously. Needed salicylate therapy may also be impossible to administer in the solid form to some medical patients. The unconscious, the greatly debilitated, those with esophagal defects, are all incapable of swallowing a tablet.

It has long been agreed, in the pharmaceutical arts, that these drawbacks would be overcome if a method could be found to administer a suitable salicylic acid derivative in solution. Such a solution would offer no obstacle to those who can not swallow a tablet, it could be mixed with milk, fruit juice or any of a dozen common beverages for children, and it could be given by nasal tube or even hypodermically when necessary. There are at least two possible ways of achieving this: one of the presently approved salicylates might be dissolved in some solvent other than water, or a satisfactory new, water-soluble derivative might be developed.

The former alternative does not appear to hold any promise. Many solvents have been tested without success. Those which have sufficient solvent power are too toxic; those which are safe to use either are poor solvents or promote decomposition of the solute.

The other possibility has also been extensively tested. Sodium salicylate is very soluble in water, and may sometimes be used. It is not well regarded, however, as its toxicity is unduly high and it has a tendency to cause gastro-intestinal irritation. Acetylsalicylic acid is highly recommended, since in it both toxicity and side-reactions are at a minimum. It forms salts of high water solubility, but these are unfortunately extremely unstable, even in the dry state. Neutralization of the carboxyl group in acetyl-salicylic acid seems to make the acetyl linkage extraordinarily sensitive to hydrolysis; acetic acid is liberated at once, under even the mildest conditions, and the decomposition proceeds rapidly. Salicylsalicylic acid behaves similarly. No problem of instability to hydrolysis exists with salicylamide. It has no free carboxyl group to form a salt, and thus can not be rendered soluble in the above manner. It can, however, be very finely divided and suspended in water to form a liquid preparation of fair stability. The need is only partially met by such a suspension, because settling will occur with any practicable degree of subdivision of the drug, and because the pharmacologic properties of salicylamide are sufficiently different from those of acetylsalicylic acid so that the two are not always interchangeable.

One aspect of the present invention involves the discovery that a derivative of acetylsalicylic acid in which a short carbon chain bearing a sulfonic acid group is linked to the nucleus through the carboxyl group is very soluble in water, and gives an essentially neutral solution. It has further been proven to have an analgesic activity slightly higher, and a toxicity slightly lower, than acetylsalicylic acid itself. Hydrolysis in solution is very slow, a small fraction as fast as with acetylsalicylic acid, and can be further reduced without impairing the solubility by the addition of innocuous adjuvants such as sugars, glycerine, sorbitol and the like.

Substances of this type are easily and economically prepared through the reaction of a sultone with the salt of the corresponding carboxylic acid. A sultone is the inner ester of a hydroxysulfonic acid of appropriate orientation, corresponding to the lactone of a hydroxycarboxylic acid. Several examples, among them propane sultone (the sultone of 3-hydroxypropane sulfonic acid), butane sultone (the sultone of 4-hydroxybutane sulfonic acid) and tolyl sultone (the sultone of benzyl alcohol ortho-sulfonic acid), are commercially available. To induce the combination, the reactants are mixed intimately in the proper proportions and heated. The sultone is a ring, which in this reaction opens. The alcoholic function unites with the carboxyl group to form an ester linkage, while the sodium salt moiety is transferred from the carboxyl to the sulfonic group. The product is the sodium salt of a sulfoester of the original carboxylic acid.

The reaction is restricted, for the purposes of the present invention, to salicylic acid itself, or more precisely to its salts. That is to say, it can not be carried out on a derivative of salicylic acid other than its simple salts. If it be attempted on a derivative which involves the carboxylic group, as the amide or an ester, no reaction will occur. The carboxylic acid salt is thus seen to be indispensable in the practice of the present invention. Similarly, if it be attempted upon a derivative which involves the hydroxylic function, as acetylsalicylic acid or a salt thereof, extensive decomposition takes place with liberation of free acetic and salicylic acids, and the desired product is not obtained. In order to prepare a sulfoester of acetylsalicylic acid, therefore, it is necessary first to prepare the sulfoester of salicylic acid, and subsequently to acylate this intermediate.

While the combination of sultone with carboxylic acid salt may be accomplished simply by heating in the absence of a solvent, a solvent is nevertheless desirable, as in this manner more intimate mixing is obtained and the sultone is prevented from subliming out of the reaction zone. The yield and purity of the product are thus improved. The usual solvents for sodium salicylate, namely, water and the lower alcohols, are not, however, suitable, because in them solvolysis of the salt occurs to some extent. As a result, the sultone reacts in part with the solvent, forming byproducts which must then be laboriously removed. This difficulty is obviated by use of a non-solvolytic solvent. In this application dimethyl formamide has been found to be highly effective. It has very high solvent power for both reactants, and since it contains no acidic hydrogen it is incapable of causing solvolysis of the salt.

Acylation of the intermediate is readily accomplished by the usual techniques. No complications are introduced by the fact that it is the sodium salt of a sulfoester which is to be acylated; the acylation reaction proceeds as smoothly as with salicylic acid itself. The acid anhydride is the reagent of choice. While an acid chloride may be used here, it is less desirable than the corresponding anhydride because the HCl liberated has a deleterious effect on the sodium sulfonate. The corresponding carboxylic acid itself may also be used, but is similarly undesirable because the water formed in the acylation tends to hydrolize the sulfoester linkage to some extent.

Some examples of salicylic acid derivatives of the present invention have been tested biologically for toxicity and analgesic activity. The $LD_{50}$ was determined in rats, rabbits and dogs by standard techniques, administering aqueous solutions intragastrically. The effectiveness as an analgesic was measured in rats by two methods: by the time elapsed before the animal attempted to escape from a standard heat stimulus applied to the tail, and by the voltage that must be applied to a rectal electrode to elicit a squeak from the animal. In both these methods, the effectiveness was established by finding the dose required to produce the same degree of analgesia as a specified dose of ordinary acetylsalicylic acid. The following table presents the results obtained with the representative sodium γ-sulfopropyl acetylsalicylic ester, prepared by acetylating the reaction product of propane sultone and sodium salicylate:

|  | Sodium γ-sulfopropyl Acetylsalicylic Ester | Aspirin |
|---|---|---|
| $LD_{50}$ in rabbits_____mg./kg__ | 1,900 |  |
| $LD_{50}$ in dogs_____mg./kg__ | 1,800 |  |
| $LD_{50}$ in rats_____mg./kg__ | 1,830 | 1,350 |
| Dose required for standard response to heat-avoidance test in rats_____mg./kg__ | 4.2 | 5 |
| Therapeutic ratio based on heat-avoidance test in rats_____ | 436 | 270 |
| Dose required for standard response in electric shock test in rats_____mg./kg__ | 80 | 95 |
| Therapeutic ratio based on electric shock test in rats_____ | 22.9 | 14.3 |

Sodium γ-sulfopropyl acetylsalicylic ester is thus shown to be about 120% as effective as acetylsalicylic acid itself, and only about 75% as toxic. The therapeutic ratio of this drug (the ratio of the $LD_{50}$ to the therapeutic dose) is therefore nearly twice as favorable as for aspirin.

Salicylic acid derivatives of this type have a very wide application. The high water solubility permits of their administration in a concentrated dose, and the fact that their solutions are effectively neutral and are not precipitated by either acids or bases makes them compatible with most foods, materia medica and biological fluids. They are well suited to hypodermic injection.

*Example 1—Sodium γ-sulfopropyl salicylic ester.*— One mole (160 gms.) of dry sodium salicylate and one mole (122 gm.) of propane sultone are ground together until a uniform mixture is obtained. This is placed in a loosely-stoppered flask which is immersed in an oil bath held at 130–150° C. The sultone first melts to form a paste with the sodium salicylate; shortly thereafter a rapid reaction sets in which soon transforms the whole to a uniform infusible white solid. When the reaction has subsided, the mass is cooled and dissolved in the minimum of boiling methanol. About 5 liters of solvent is required. The solution is filtered rapidly by gravity if not perfectly clear, and cooled strongly for 12 hours or longer. The product separates as warty nodules made up of rosettes of fine needles. It is collected on a filter, washed with a little cold methanol, and dried at about 80° C. The dry product is a snow-white powder, hygroscopic and very soluble in water to give a clear solution. The pH of such a solution is between 5 and 6; neither acid nor base produces any turbidity. About 230 gm. is obtained; by concentrating the methanolic mother liquors to around one-fifth their volume a further crop of some 40 gm. may be recovered. The elementary analysis of this material corresponds to the hemihydrate of sodium γ-sulfopropyl salicylic ester:

|  | Calculated for $C_{10}H_{11}O_6SNa$, $\frac{1}{2}H_2O$ | Found |
|---|---|---|
|  | Percent | Percent |
| Carbon | 41.3 | 41.3 |
| Hydrogen | 4.13 | 4.19 |
| Sulfur | 11.0 | 11.2 |
| Sodium | 7.90 | 7.94 |
| Water (Fisher-Johns) | 3.1 | 3.4 |

*Example 2—Sodium γ-sulfopropyl salicylic ester.*— One mole (160 gm.) of dry sodium salicylate and one mole (122 gm.) of propane sultone are placed in a reflux apparatus together with 300 cc. of dimethyl formamide. On warming both solids dissolve completely. The resulting solution is gently refluxed for 15 to 30 minutes. At the end of this time the reaction mixture is cooled somewhat and the apparatus is revised to provide for vacuum distillation of the solvent. Dimethyl formamide is distilled off as completely as possible from a steam or boiling water bath under the lowest pressure readily attainable. The pressure may not be appreciably in excess of 30 mm. of mercury if the solvent is to be efficiently recovered. When no further distillation can be observed, the dry residue is recrystallized from methanol as in Example 1. A second recrystallization is here advisable, to remove the last of the dimethyl formamide. The yield and properties of the product are the same as those cited in Example 1.

*Example 3—Sodium γ-sulfopropyl acetylsalicylic ester.*—One mole (282 gm.) of sodium γ-sulfopropyl salicylic ester is placed in a reflux apparatus. It is not necessary to use a purified product: the crude reaction product as prepared in either Example 1 or Example 2 above is entirely satisfactory. Acetic anhydride (2.5 moles, 250 cc.) is added, and the mixture is heated. The solid dissolves completely before the boiling point is reached. The solution is refluxed gently for 15 to 30 minutes, then cooled somewhat, and the solvent is removed as completely as possible by distillation in vacuo from a steam or boiling water bath. A second portion of 200 to 250 cc. of acetic anhydride is added, and the mixture is once more refluxed for a short time. The solvent is again evaporated as completely as possible in the same manner, to leave a syrupy residue which sets, on standing in the cold, to a crystalline cake. This is dissolved in 1200–1500 cc. of boiling 95% alcohol and quickly filtered, hot, by gravity, if not perfectly clear. The product separates from this solution, on standing for several hours in the cold, as tiny white plates. A second recrystallization is advisable if a crude intermediate prepared in dimethyl formamide was used. The final filter cake is stirred up thoroughly with 1000–1500 cc. of a volatile organic liquid which is miscible with alcohol but a non-solvent for the product, such as ether or acetone. The product should be pressed as dry as possible on the filter when this wash liquid is separated, as residual alcohol in the cake tends to interfere with the drying process. The last traces of solvent are evaporated in a warm air oven, starting at room temperature and increasing the heat gradually, as drying proceeds, to a maximum of 70–80° C. There is obtained about 250 gm. of a snow-white powder; by concentrating the alcoholic mother liquors to approximately ⅕ their volume another 50 gm. or so may be recovered. The product is somewhat hygroscopic and very soluble in water, dissolving to give a clear solution with a pH of 5 to 6. Neither acid nor base produces any turbidity. The elementary analysis of this material corresponds to sodium γ-sulfopropyl acetylsalicylic ester:

|  | Calculated for $C_{12}H_{13}O_7SNa$ | Found |
| --- | --- | --- |
|  | Percent | Percent |
| Carbon | 44.4 | 44.3 |
| Hydrogen | 4.01 | 4.17 |
| Sulfur | 9.87 | 9.73 |
| Sodium | 7.09 | 7.08 |

*Example 4—Sodium γ-sulfopropyl acetylsalicylic ester.*—One mole (282 gm.) of sodium γ-sulfopropyl salicylic ester is placed in a distillation apparatus. It is not necessary to use a purified product: the crude reaction product as prepared in either Example 1 or Example 2 above is entirely satisfactory. Acetic anhydride (5 moles, 500 cc.) is added, and the mixture is gradually brought to a boil. Solvent is very slowly distilled from the reaction at atmospheric pressure, with close attention to the vapor temperature at the still-head. This should be approximately 120° C. at the beginning of the distillation, and the rate at which liquid passes over should be controlled so that the vapor temperature does not exceed 135° C. until at least 50 cc. of distillate has been collected. The still-head temperature may thereafter rise to 140° C. or higher without harm. The atmospheric pressure distillation is continued until a total of approximately 200 cc. of distillate has been collected. The still is evacuated at this point, and removal of the solvent is continued, with steam or boiling water as the source of heat, until no further distillate can be obtained. The residue is a syrup which sets, on cooling and standing, to a hard crystalline cake. This is recrystallized from alcohol, washed with ether or acetone and dried as described in the preceding Example 3. The yield and properties of the product are the same as those cited in Example 3.

While I have described the present invention in terms of preferred examples, it will be understood that various modifications and supplemental steps may be employed in carrying out the process as defined in the appended claims. For instance, other non-solvolytic ionizing solvents, such as dimethyl acetamide or liquid sulfur dioxide, may be substituted for dimethyl formamide in the addition step of the reaction, and other sultones, such as butane sultone (the sultone of 4-oxybutanesulfonic acid) or tolyl sultone (the sultone of benzyl alcohol o-sulfonic acid) may replace propane sultone.

Having thus described my invention, I claim:

1. The products of the general formula

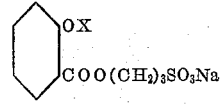

wherein X is selected from the group consisting of H and $COCH_3$

2. As a new composition of matter, the sodium salt of γ-sulfopropyl salicylic ester.

3. As a new composition of matter, the sodium salt of γ-sulfopropyl acetylsalicylic ester.

4. In a process for preparing the sodium salt of γ-sulfopropyl salicylic ester the step of heating sodium salicylate with a stoichiometric proportion of propane sultone in a non-solvolytic ionizing solvent.

5. The process of claim 4 further characterized by the fact that the non-solvolytic solvent is dimethyl formamide.

6. A process for preparing the sodium salt of γ-sulfopropyl acetylsalicylic ester comprising the steps of causing sodium salicylate and propane sultone in stoichiometric proportions to react together at an elevated temperature and refluxing the reaction product with an excess of acetic anhydride.

7. The process of claim 6 further characterized by the fact that the reaction between sodium salicylate and propane sultone is carried out in a non-solvolytic ionizing solvent.

8. The process of claim 7 further characterized by the fact that the solvent is dimethyl formamide.

References Cited in the file of this patent

UNITED STATES PATENTS 2,179,209    Daimler _____ Nov. 7, 1939

FOREIGN PATENTS 273,221    Germany _____ Apr. 21, 1914
867,396    Germany _____ Feb. 16, 1953